April 27, 1954  R. J. BRITTAIN, JR  2,676,854

JOURNAL BOX

Filed Dec. 7, 1951

INVENTOR
RICHARD J. BRITTAIN JR
BY Edward K. Goodrich
HIS ATTORNEY.

Patented Apr. 27, 1954

2,676,854

UNITED STATES PATENT OFFICE 2,676,854

JOURNAL BOX

Richard J. Brittain, Jr., Berkeley Heights, N. J., assignor to General Motors Corporation, Detroit, Mich., a corporation of Delaware Application December 7, 1951, Serial No. 260,451

8 Claims. (Cl. 308—41)

This invention relates to journal boxes and more particularly to an end thrust arrangement for absorbing and cushioning the end thrust of an axle in a railway journal box.

An object of the invention is to provide an improved construction for resiliently absorbing the end thrust of an axle in a journal box. A further object is to provide an improved end thrust construction wherein the thrust members are easily accessible for assembly or removal through a detachable end of a journal box. To these ends and also to improve generally upon devices of this character, the invention consists in the various matters hereinafter described and claimed.

Figure 1:
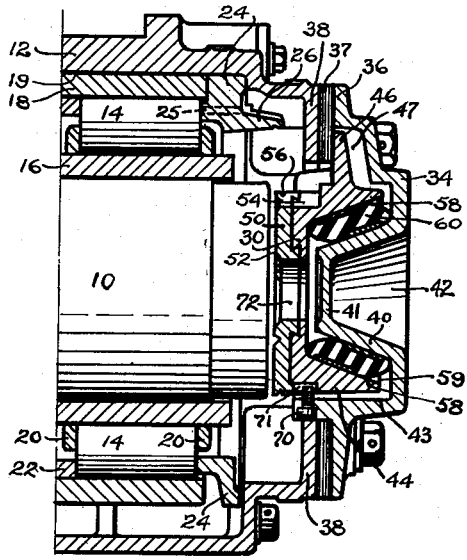
Figure 1 is a fragmentary vertical section showing the forward or outer end of the journal box.

An axle 10 is rotatably supported within a journal box 12 by hardened bearing rollers 14 that roll upon a hardened bearing sleeve 16 pressed onto the axle and upon a hardened bearing sleeve 18 pressed into a journal box bore 19. There are preferably two sets of rollers 14 guided by a cage 20 and spaced axially by an intermediate ring 22 generally as shown in the United States patent to Brittain No. 2,245,323. The rearward end of the box, which is not illustrated since it does not comprise part of this invention, may be suitably constructed and preferably in general conformity with the aforementioned Brittain patent. A lubricator ring 24 pressed into the bore 19 betweeen the end of the sleeve 18 and a journal box shoulder receives lubricant, as oil, from the bearing rollers and delivers it through a passage 25 and an inclined lip 26 onto a thrust block 30 normally spaced from the axle but receiving the thrust of the axle when it shifts endwise towards the outer end of the journal box. An end cap 34 has an outwardly extending flange 36 whose flat face is secured, as by cap screws, against one or more shims 37 seated against the flat face of an inwardly extending flange 38 at the end of the box.

An inwardly tapering conical end cap wall 40, terminating in an end wall 41 spaced from the axle end, coaxially extends within an end cap bore 43 that loosely receives an annular portion 44 of the thrust block for endwise thrust block movement. The end cap 34 is externally recessed at 42 to aid cooling of the various parts. A plurality of circumferentially spaced radially extending lugs, one of which is shown at 46, are loosely received in correspondingly located end cap recesses 47 that prevent thrust block rotation and which allow for the required endwise thrust block movement. Flat faces on these lugs seat against the shims 37. Cast upon the end of the thrust block 30 is a facing member 50, composed of bronze or other material which has a low coefficient of friction with steel in the presence of lubricant, and having a flat end face 52 similar in size to and engageable with the flat axle end when the axle shifts endwise. Oil received in a thrust block cavity 54 from the lip 26 is fed to an eccentric groove in the face 52 to provide lubrication between the thrust block and axle. To determine the extent of facing member wear, the space betweeen the face 52 and a peripherally extending witness groove 56 in member 50, may be measured. The thrust block has an internal conical wall 58 spaced about the end cap wall 40 and extending into the annular end cap recess, this conical wall terminating at its outer end in an annular end face 59 adapted to engage against the end cap and limit further endwise axle movement in the unusual instance when a resilient cushion 60 within the annular tapering space between the thrust block and end cap does not absorb all endwise axle thrust.

The cushion member 60 comprises a conical ring of synthetic rubber or other suitable yieldable material that is inherently and deformably resilient in all directions and which will not deteriorate in the presence of oil. This cushion peripherally seats against the conical end cap wall 40 and against the conical thrust block wall 58 and has rounded ends respectively engaging an end wall of the thrust block and against the bottom of the annular recess of the end cap. Due to the loose fit of the thrust block 30 within the end cap bore 44 and the resiliently yieldable character of the cushion, the thrust block facing member 50 will uniformly seat against the axle end under thrust load.

Externally merging with the outer cushion periphery is a conical metal reinforcing sleeve 62 having its ends in non-uniformly spaced relation to the cushion ends, the larger sleeve end terminating a greater distance from the larger cushion end than the spacing of the smaller sleeve end from the smaller cushion end. A smaller conical metal reinforcing sleeve 63, axially offset towards the larger cushion end with respect to the sleeve 62, has its internal periphery merging with the inner conical cushion surface and has its ends in non-uniformly spaced relation with the cushion ends, the smaller end of this sleeve being at a greater distance from the small cushion end than is the larger end of this sleeve from the larger cushion end. These sleeves 62 and 63 are integrally bonded to the resilient rubber-like cushion material as by cement or vulcanizing. The larger end of the cushion bore merges with a short radius annular nose 65 which in turn blends with a portion of larger radius 66 that merges with the outer cushion periphery. Similarly, the smaller end of the outer cushion periphery merges with a small radius annular nose 67 which blends into a portion 68 of larger radius that merges with the conical inner bore of the cushion.

Figure 2:
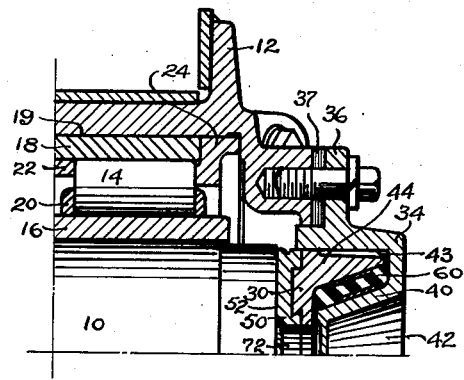
Figure 2 is a fragmentary central horizontal section of the forward end of the box.
Figures 3, 4:
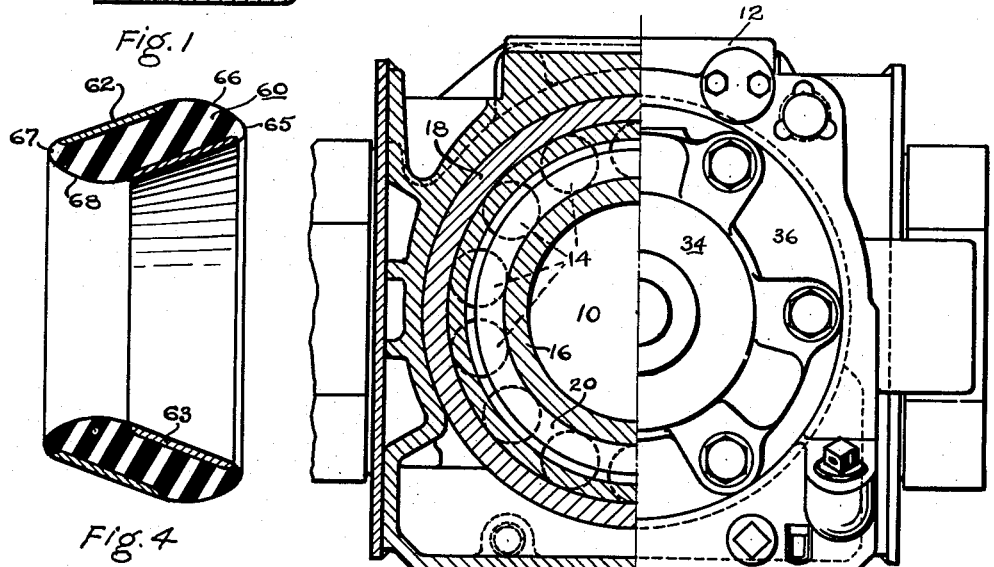
Figure 3 is an end view partly broken away in vertical cross section.
Figure 4 is an enlarged cross section of the shock absorbing cushion.

A screw 70 in the end cap 34 and loosely entering an open end slot 71 in the thrust block holds the parts together during assembly but does not restrict the thrust block movement when in axle engagement. The inner end wall at the end of the conical thrust block wall 58 is so located with respect to the shim-engaging faces of the lugs 46 that when the parts are assembled the noses 65, 67 are slightly compressed to place the cushion 60 and the thrust block under an initial preload. Under the end thrust of the axle 10 against the thrust block 30 the cushion ends first deform to yieldably cushion a light load. As the axle thrust increases this thrust is resiliently absorbed in correspondingly increasing amount under the shear deformation of the body portion of the cushion, resulting from the relative endwise movement of the sleeves 62, 63, until the cushion finally goes solid and completely fills the conical annular space in which it is mounted as shown in Figure 2. The metal reinforcing sleeves 62 and 63 are non-uniformly spaced with respect to the ends of the initially uncompressed cushion 60 so that under heavy endwise compression when the cushion completely fills the space in which it is mounted, these sleeves will be in alignment and have their ends remote from any possible abutting relation with the thrust block 30 and/or the end cap 34. Hence, these sleeves do not limit the extent of endwise thrust block movement. Further endwise compression of the cushion is finally limited by the abutting of the end face 59 against the end cap 34. A central bore 72 through the thrust block and also the loose fit of the thrust block within the end cap 34 prevents the pocketing of oil or other media which might hamper the yieldable action of the cushion 60. As the facing member 50 becomes worn, one or more of the shims 37, as required, may be removed to relocate the end face 52 at its desired initial distance from the end of the axle.

I claim:

1. In a journal box having an axle journalled for rotation and axially shiftable therein, an end cap demountably secured to the box, a movable thrust block for receiving end thrusts of the axle, inner and outer annular end cap walls providing therebetween an annular recess opening into the journal box towards the axle, an annular thrust block portion extending into the recess, a resilient annular cushion fitted over the inner annular end cap wall and resiliently supporting the thrust block portion to absorb end thrust of the axle, inner and outer reinforcing sleeves integrally secured to the annular cushion and subjecting the cushion to shear deformation under endwise axle thrust against the thrust block, said sleeves being axially offset with respect to each other, and each sleeve having its ends spaced inwardly from the ends of the cushion.

2. In a journal box having an axle journalled for rotation and axially shiftable therein, an end cap demountably fastened to the box and having a circular recess, a thrust block spaced from the end of the axle and contained partly within the box and partly within the recess of the end cap, a compressed annular resilient cushion entering the recess and engaging the end cap and thrust block, a pair of radially spaced reinforcing sleeves integrally secured to the annular cushion, said sleeves being axially offset with respect to each other and imparting a shear deformation to the cushion in response to end thrust of the axle against the thrust block, and each sleeve having its ends spaced inwardly from the ends of said cushion and at all times out of end abutting engagement with the thrust block and end cap.

3. In a journal box having an axle journalled for rotation and axially shiftable therein, an end cap having an annular recess opening into the box, one wall of the recess comprising a conical end cap wall with its smallest diameter inwardly of the box, a movable thrust block engageable with the end of the axle, an annular thrust block portion extending into the recess and having a conical wall extending around the conical end cap wall, an annular conical inherently resilient cushion fitted between the conical walls, a conical reinforcing sleeve integrally secured to the cushion and having its ends spaced inwardly from the ends of the cushion, and peripherally spaced thrust block projections engageable with an end of the journal box and limiting the movement of the thrust block towards said axle.

4. In a journal box having an axle journalled for rotation and axially shiftable therein, an end cap having an annular recess opening into the box, one wall of the recess comprising a conical end cap wall with its smallest diameter inwardly of the box, a movable thrust block engageable with the end of the axle, an annular thrust block portion extending into the recess and having a conical wall extending around the conical end cap wall, an annular conical cushion of inherently resilient material between said conical walls, inner and outer conical reinforcing sleeves integrally secured to the annular cushion and respectively seated against said conical walls, said sleeves being axially offset with respect to each other and subjecting the cushion to shear deformation under axle end thrust against the thrust block, and each sleeve having its ends spaced inwardly from the ends of the cushion.

5. In a journal box having an axle journalled for rotation and axially shiftable therein, an end cap demountably secured to and closing an end of the box, a thrust block spaced from the end of the axle and having a conical wall forming an internal conical recess, the end cap having a conical wall extending towards the box and into the conical recess, an annular conical cushion of inherently resilient material interposed between the conical walls, internal and external reinforcing sleeves bonded to the cushion and respectively seated against said conical walls, said sleeves being in axially offset relation to each other and imparting shear deformation to the resilient cushion under axle end thrust against the thrust block, and each of said sleeves having its ends spaced inwardly from the cushion ends and locating at all times out of end engagement with the end walls of the cushion receiving recess.

6. In a journal box having an axle journalled for rotation and axially shiftable therein, an end cap demountably secured to and closing an end of the box, a thrust block spaced from the end of the axle, means adjustably positioning the thrust block with respect to the end of the axle, the thrust block having a conical recess, a conical end cap wall extending into said recess, an annular conical cushion interposed between the conical walls, a thrust block engaging member independent of the end cap and holding the conical cushion under an initial preload, said cushion comprising a member deformably resilient in all directions and having conical metal reinforcing sleeves bonded to its inner and outer walls, said sleeves being axially offset with respect to each other and imparting shear deformation to the cushion under end thrust of the axle against the thrust block, each sleeve having its ends spaced inwardly at different distances from the corresponding ends of the cushion, and the ends of the sleeves locating at all times out of abutting engagement with the end walls of the cushion-receiving recess.

7. In a journal box having an axle journalled for rotation and axially shiftable therein, an end cap demountably secured to and closing an open end of the box, a thrust block spaced from the end of the axle and having a conical wall forming an internal conical recess, said recess terminating in an end wall of the thrust block, a conical end cap wall extending into the recess, an end wall on said cap abutting the conical end cap wall, an annular conical cushion of inherently resilient material interposed between the conical walls, each end of the cushion terminating in an annular nose portion of short transverse radius, these nose portions respectively engaging said end walls, each end of the cushion being provided with an annularly extending transversely curved portion having a radius longer than that of the nose portions and extending backwardly from one of the nose portions into merging relation with a conical surface of the cushion, internal and external conical reinforcing sleeves bonded to the cushion and axially offset with respect to each other, and each reinforcing sleeve terminating in spaced relation to said end walls and axially inwardly of the corresponding cushion end.

8. In a journal box having an axle journalled for rotation and axially shiftable therein, an end cap demountably secured to and closing an open end of the box, a thrust block spaced from the end of the axle and having a conical wall forming an internal conical recess, an end thrust block wall in said recess, a conical end cap wall axially extending into the recess, an end wall on the cap abutting the conical end cap wall, an annular conical cushion of inherently resilient material interposed between the conical walls, each end of the cushion having an annular nose portion of short transverse radius, these nose portions respectively engaging said end walls under initial preload, radial thrust block projections engageable with an end portion of the journal box within the end cap and determining the extent of said preload, each end of the cushion having an annularly extending curved portion of transverse radius longer than that of the nose portion and extending backwardly from merging relation with a nose portion and into merging relation with a conical cushion surface, internal and external conical reinforcing sleeves integrally bonded to the cushion walls, said sleeves being axially offset with respect to each other, and each sleeve end terminating axially inwardly from a corresponding cushion end and located at all times in spaced relation to said end walls.

References Cited in the file of this patent

UNITED STATES PATENTS

| Number | Name | Date |
|---|---|---|
| 1,758,712 | Morris | May 13, 1930 |
| 2,292,607 | Brittain | Aug. 11, 1942 |

FOREIGN PATENTS

| Number | Country | Date |
|---|---|---|
| 839,034 | France | Mar. 22, 1939 |